United States Patent Office 3,282,748
Patented Nov. 1, 1966

3,282,748
WELD-STRENGTHENING PROCESS
Charles H. Martens, Huntsville, Ala., assignor to the United States of America as represented by the Secretary of the Army
No Drawing. Filed Jan. 13, 1964, Ser. No. 337,504
9 Claims. (Cl. 148—125)

The invention described herein may be manufactured and used by or for the government for government purposes without the payment of any royalty thereon.

The present invention relates to a method for strengthening welds in metal fabrication processes. Particularly, the invention concerns a method for strengthening welds through mechanical working at cryogenic temperatures.

It is well known in the art that the strength of a welded object is diminished in the regions around the weld. This weakening is due, in part at least, to heat-responsive changes within the metal itself as well as internal stresses resulting from uneven heating and cooling. Consequently, there is a great need for some means of improving the weld strength of metal objects to restore overall strength of the object, that is, to strengthen the weld and the metal in the vicinity of the weld so that it approaches the strength of the original metal prior to welding.

It has been determined that strength of welds and the metal in the vicinity of the welds can be greatly increased if the weld and adjacent metal are subjected to some form of mechanical working at cryogenic temperatures. As used herein, cryogenic temperature is intended to include temperatures of $-100°$ F. and lower, preferably lower.

Welds in all metals normally joined by welding such as steel, aluminum, titanium, stainless steel, and the like respond satisfactorily to the methods of the present invention. The welds in the austenitic stainless steels undergo a marked increase in strength, with the welds in AISI 301 being unusually good. The strengthening does not appear to be dependent on the type of weld since electric welds, gas welds, welds made in inert atmosphere, and the like, are strengthened by the process.

Moreover, the present process is useful in restoring strength to a metal which is cut by a cutting torch or other device that severs the metal through the use of heat (i.e., burns through the metal). When metal is cut in this manner, heat-responsive changes in the microstructure of the metal as well as locked-in stresses resulting from uneven heating and cooling of the metal cause the metal adjacent the cut to weaken. By mechanically working the area of metal adjacent to the cut while maintaining the temperature of the metal at about $-100°$ F. or less, much of the strength of the metal can be restored.

In accordance with the foregoing, it is an object of the present invention to provide a method for strengthening welds in metals.

Another object is to provide a method for strengthening welds and the areas adjacent the welds by mechanically working the welds and the adjacent metal at temperature of about $-100°$ F. and lower.

A further object of the invention is to provide a method for strengthening welds in austenitic stainless steels, particularly the AISI 300 series, by mechanically working the welds and adjacent areas while maintaining at least the welded region of the metal at a temperature of about $-100°$ F. or lower.

The manner in which these as well as other objects can be accomplished will become apparent from the following detailed description.

The term "mechanical working" as used herein is intended to include the application of force such as electric vibration, vibration from ultrasonic hammering, pressing, rolling, and drawing or stretching. In most instances hammering and rolling under pressure will be most convenient for use with the present invention. However, the particular means for working the metal will depend on the size and shape of the object being treated as well as the available facilities.

The easiest means for lowering the temperature of the metal object being treated is to immerse the entire object (or at least that portion to be treated) in a low-temperature fluid and allowing the temperature of the object to come to equilibrium with the fluid. The temperature of the fluid should be at least about $-100°$ F. and preferably lower. Suitable fluids include Dry Ice-acetone baths, liquid nitrogen ($-320.4°$ F.), liquid air, and liquid helium. However, the preferred fluid is liquid nitrogen since it is readily available and can be used to achieve very low temperatures. When using liquid nitrogen, it is usually desirable to let the temperature of the metal object come to equilibrium with that of the nitrogen, particularly with the austenitic stainless steels, although good results can be achieved by lowering the temperature of the metal object to only about $-100°$ F.

The temperature of the metal object can also be lowered by spraying it with a low temperature fluid or merely by placing it in a refrigerator which is maintained at a sufficiently low temperature. The means employed for lowering the temperature are not themselves critical. The important thing is that the temperature of the metal being worked be maintained at about $-100°$ F. or lower while it is being worked.

In carrying out the invention, the mechanical working can be conducted while the object is immersed in a cold fluid or being sprayed with such a fluid. On the other hand, the objects can also be removed from the fluid for working.

The invention is particularly suited for the strengthening of welded pressure vessels such as gas storage tanks and rocket combustion chambers. In the latter instance, it is especially important to restore strength to the welded metal chamber to prevent the necessity of using heavier metals to achieve the required strength since the heavier metal also increases the weight of the engine. For example, one method of fabricating solid rocket motor cases made from AISI 301 austenitic stainless steel involves using a girth weld to join two half-cylinders. This weld weakens the metal adjacent to the weld and this region usually constitutes the weakest part of the motor case. In order that this deficiency be obviated, a heavier gauge is used in making the case. This extra thickness furnishes the added strength needed at the region of the girth weld but it also overstrengthens the remainder of the case and greatly increases the weight of the motor case. By using the present invention, the motor case can be fabricated from the smallest gauge of steel required to meet the particular strength requirements of a given engine. The weakened region of the chamber surrounding the girth weld is then restored to approximately its original strength by hammering or rolling the weld and metal adjacent to the weld while maintaining the temperature of the case at about $-100°$ F. and preferably at $-320.4°$ F. (the temperature of liquid nitrogen). The weld may be hammered by inserting an anvil through one end of the motor case and positioning it below the weld and in contact with the casing. A hammer located above the weld hammers the weld and the metal adjacent the weld while the cylinder is rotated to expose all the weld to this working technique. During the hammering, the temperature of the weld and adjacent metal should be maintained at a temperature of about $-100°$ F. or lower using one of the above described techniques. The force applied by the hammer can vary from about a few pounds or even ounces in the case of very small and fragile electronic components to hundreds of tons for large, heavy objects such as large rocket motor cases. The size, composition, and temperature will determine the force to be applied in the working process. Generally speaking, the same forces can be used as would be applied in "hot" working techniques. After such treatment, the strength of the weld and metal adjacent to the weld closely approaches that of the original metal.

This same technique can be applied to welded plate and the like as well as to the metal adjacent a cut made with a torch or any other device which causes overheating of the metal in the region of the cut. Moreover, instead of hammering, the metal can be rolled between two or more rollers which apply force to the metal or the metal can be drawn or stretched. However, regardless of the mechanical working process selected, the temperature of the metal and/or weld being treated should be at least $-100°$ F. or less.

The present method can be coupled with conventional heat treating techniques or other standard metal strengthening processes if desired. For example, good results have been achieved when the metal and weld have been alternated between heat treatment and treatment according to the present invention.

The above descripion is for purposes of illustration only and no undue limitation of the invention should be attributed to the invention as a result thereof except as appears in the appended claims.

I claim:

1. The method of strengthening weld and the metal adjacent the weld after joining at least two pieces of metal by welding, said method comprising mechanically working said weld and the metal adjacent to said weld while maintaining the temperature of said weld and said metal adjacent to the weld at a temperature of about $-100°$ F. or less.

2. The method according to claim 1 wherein said temperature is that of liquid nitrogen.

3. The method of claim 1 wherein said metal joined by welding is an AISI 300 series stainless steel.

4. The method according to claim 3 wherein said metal joined by welding is AISI 301 austenitic stainless steel.

5. The method according to claim 4 wherein said temperature is that of liquid nitrogen.

6. The method of strengthening the metal adjacent to a cut made by burning through the metal, said method comprising mechanically working the metal adjacent the cut while maintaining at least that metal adjacent the cut at a temperature of about $-100°$ F. or less.

7. The method according to claim 6 wherein said temperature is that of liquid nitrogen.

8. The method according to claim 7 wherein said metal is an AISI 300 series stainless steel.

9. The method according to claim 8 wherein said metal is AISI 301 austenitic stainless steel.

References Cited by the Examiner

UNITED STATES PATENTS 2,429,320  10/1947  Kennedy _____ 148—125
2,824,818  2/1958  Swenson _____ 148—125

OTHER REFERENCES

A.S.M. Transactions, volume 52, Preprint No. 132, 1959, ASM, Cleveland, Ohio.

Metal and Alloys, "Subzero Treatment to Improve Tool Life," DePoy, September 1944, pages 645–649.

DAVID L. RECK, *Primary Examiner.*

C. N. LOVELL, *Assistant Examiner.*